(12) United States Patent
Richardson (10) Patent No.: US 8,640,394 B2
(45) Date of Patent: Feb. 4, 2014

(54) ARCUATE-WINGED SOLAR CANOPY ASSEMBLY

(76) Inventor: Donald S. Richardson, Providence, RI (US)

(*) Notice: Subject to any disclaimer, the term of this patent is extended or adjusted under 35 U.S.C. 154(b) by 413 days.

(21) Appl. No.: 12/873,174

(22) Filed: Aug. 31, 2010

(65) Prior Publication Data
US 2011/0203633 A1 Aug. 25, 2011

Related U.S. Application Data

(60) Provisional application No. 61/306,677, filed on Feb. 22, 2010.

(51) Int. Cl.
E04B 7/16 (2006.01)
E04H 15/26 (2006.01)

(52) U.S. Cl.
USPC .................. 52/73; 52/74; 52/173.3; 135/99

(58) Field of Classification Search
USPC ................................ 135/99; 52/73, 74, 173.3
See application file for complete search history.

(56) References Cited

U.S. PATENT DOCUMENTS

| | | | | |
|---|---|---|---|---|
| 1,645,202 A | * | 10/1927 | Miller | 52/73 |
| D192,212 S | * | 2/1962 | Schlager | D25/56 |
| 4,837,990 A | * | 6/1989 | Peleg | 52/63 |
| 5,588,779 A | * | 12/1996 | Merrett | 405/54 |
| D415,573 S | * | 10/1999 | Chipman et al. | D25/56 |
| D468,837 S | * | 1/2003 | Shilling et al. | D25/56 |
| 6,590,363 B2 | | 7/2003 | Teramoto | |
| D611,404 S | | 3/2010 | Mackler | |
| D611,405 S | | 3/2010 | Mackler | |
| D659,852 S | * | 5/2012 | Everson | D25/18 |
| 2008/0016786 A1 | * | 1/2008 | Bougioukos | 52/4 |
| 2009/0266400 A1 | * | 10/2009 | DeLiddo et al. | 136/244 |
| 2010/0000596 A1 | * | 1/2010 | Mackler | 136/246 |
| 2010/0108113 A1 | | 5/2010 | Taggart | |

FOREIGN PATENT DOCUMENTS

JP 09-002259 1/1997
WO WO 0131147 A1 * 5/2001

* cited by examiner

*Primary Examiner* — Phi A
*Assistant Examiner* — Omar Hijaz
(74) *Attorney, Agent, or Firm* — O'Connell Law Firm; Thomas P. O'Connell

(57) ABSTRACT

The invention is an assembly of elements to collect solar energy and rain water. Solar energy is converted to electricity by either photovoltaic film or laminate panels or sheets mounted atop arcuate, curved canopy structures that are formed and positioned like "wings". Rainwater is collected by the low-incidence arcuate curved wings and directed to a central trough along the wings' structural spine, which conducts it through a support column to a water container or vessel. In a preferred embodiment the vessel is an underground container extending parallel to and as long as the above-ground structural spine of the assembly.

18 Claims, 4 Drawing Sheets

ARCUATE-WINGED SOLAR CANOPY ASSEMBLY

This application claims the benefit of priority from U.S. Provisional Application No. 61,306,677 filed Feb. 22, 2010.

FIELD OF THE INVENTION

The invention relates to a lightweight, easy to assemble, arcuate-winged solar canopy assembly that that combines electric power generation with various additional uses.

BACKGROUND

Solar panels placed atop free standing structures combine power generation with, for example, shade production, which results in the maximization of the value and use of the airspace. Freestanding structures that generate electric or wind power from rooftop devices to electrically charge and run vehicles are known in the art. See for example, Japanese Patent Publication No. 09-002259, U.S. Pat. No. 6,590,363 and United States Patent Publication No. 2010/0000596 published Jan. 7, 2010. More specifically, JP 09-002259 discloses a photovoltaic power generation apparatus and a cartridge-type storage battery for a vehicle, for example a train, which can be exchanged when the vehicle is parked in a charging station having the photovoltaic power generation mounted on its roof. U.S. Pat. No. 6,590,363 discloses a charging station having a duct, a wind power generator and a battery in which the duct is formed from upper and lower panels that include a solar panel. The battery stores the power generated by the wind power generator and the solar panel and the duct is formed so as to collect wind blowing toward the wind power generator and to increase the speed of the collected wind. United States Patent Publication No. 2010/0000596 discloses a dual-inclination support structure having an array of photovoltaic modules mounted on its roof and having multiple uses such as advertising, water collection, energy transmission, and the ability too place the solar cells at different angles to improve yields. Lastly, United States Patent Publication No. 2010/0108113 discloses an aeroelastic solar power-generating canopy that can be formed over supporting structures without requiring an existing roof.

Certain problems are associated with the foregoing approaches. The rigid solar panel installations known in the art typically are mounted atop already existing roof structures. This makes them not readily accessible, often compromises roof integrity and results in a rigid and expensive assembly. In addition, conventional roof top solar arrays are typically designed and disposed along a single slope plane, which may not be ideal in some locales, and are problematic for example where there is snow or ice buildup in the winter. Inclined, fixed plane canopies with mono-planar wings cannot maximize solar collection capability without adjustment to the wing angle.

It would be advantageous to have a lightweight, multi-purpose solar canopy that can be assembled and disassembled easily and maximizes solar collection capability at times associated with air-conditioning needs and peak utility needs without the need to adjust the wing angle. It would also be advantageous if the assembly was constructed of low-maintenance materials with integral finishes, and if the downstream replacement or upgrade of the solar generation element represented minimal waste disposal costs and issues. The foregoing is provided by this invention.

SUMMARY OF THE INVENTION

The invention is an assembly of elements to collect solar energy and rain water. Solar energy is converted to electricity by either photovoltaic film or laminate panels or sheets mounted atop arcuate, curved canopy structures that are formed and positioned like "wings". Rainwater is collected by the low-incidence curved wings and directed to a central trough along the wings' structural spine, which conducts it through a support column to a water container or vessel. In a preferred embodiment the vessel is an underground container extending parallel to and as long as the above-ground structural spine of the assembly. The low-incidence curved wings allow for optimal solar collection (i.e., power production) in mid-day during summer months in the northern latitudes when utilities often experience their highest daily and historic demand. The principal application is for parking lots, as the full canopy assembly provides site and vehicle cooling, and mitigates against albedo effect for additional environmental benefits. The invention can be used to collect solar energy, and water from rain or snowmelt. In addition to parking lots, it can be installed in parks, marinas, walkways, remote areas, and urban areas with adequate solar access to provide electricity and store water for later distribution. It further provides a non-polluting, zero carbon emission method of supplying electricity, and the ability to charge or re-charge electric vehicles or equipment without additional fuel expenditure or supplemental connection to an existing electrical grid. In it's parking lot application, it provides shade for vehicles, thereby reducing the need for drivers to run their air conditioning systems to pre-cool their vehicles prior to driving. In its farm application, it collects water for redistribution, provides electricity to pumps and other farm equipment and provides shelter for crop, feed, animals and equipment storage. In it's marine application, it may be erected on a pier and provide grey water for cleaning watercraft, power for recharging boat batteries and sunshade for pier users and craft. The arcuate curvature in the winged solar canopy assembly of the invention creates a "waterfall effect", such that water moving toward the trough at the proximal edges of the canopy increases in speed due to the curvature and pulls the water at the distal edges of the canopy along with it. This causes the water on the distal edges of the canopy to move faster than water falling on a non-curved canopy. This "sweeping" of the canopy by rainfall assists in the cleaning of the assembly. In addition, the structure and shape of the canopy wing arms allow the edges to vibrate in the wind, which also facilitates the movement of water, snow and debris off the canopy.

The solar canopy assembly of the invention includes at least two pairs of dual-inclined wing structural arms. The arms are composed of a first pair of low-incidence, downwardly-curved or arcuate wing arms and a second pair of low-incidence, downwardly curved or arcuate wing arms. Each of the first and second pairs of downwardly-curved arcuate wing arms have proximal ends and distal ends. The proximal ends in each pair are arranged to be in opposed relation to each other, forming a structural spine in the assembly. The curvature in the downwardly-sloping, arcuate, wing arms begins at the distal ends of the wing arms and increases in steepness as one nears the proximal ends and structural spine. For stability, the wing arms increase in thickness from their distal ends, which are relatively thin, to their proximal ends, which are relatively thick. These first and seconds dual-inclined wing members are arranged in spaced apart relation to each other for reasons discussed below.

The assembly of the invention also includes at least two support columns for supporting the wing arms. A first support column is end-mounted on a ground surface or in the ground at its lower end and extends vertically along a substantially longitudinal axis to support at its other end the weight of the first pair of dual-inclined wing structural arms. A second support column is likewise end-mounted on a ground surface or in the ground and extends vertically along a substantially longitudinal axis to support at its other end the weight of the second pair of dual-inclined wing members. The support columns have a height sufficient to enable vehicles to traverse or park underneath the canopy assembly. Their maximum height is limited by the length of the wing arms, the distance between them, and the overall structural integrity of the assembly. The first and second support columns and wing members are in spaced-apart relation to each other. The distance between the support columns and their corresponding structural arms is variable, and choosing an appropriate distance is well within the skill in the art, a typical distance being between about 9 ft to about 15 ft. Additional support columns and wing structural arms may be employed and arranged in the same fashion.

The third major element composing the assembly is at least one pair of rigid arcuate canopy decks. The pair of arcuate canopy decks is formed and positioned to span from one wing member pair to another wing member pair and is mounted on the top surface of each wing member at the deck edges. The decks are further formed and positioned to follow the curvature of the pairs of low-incidence, arcuate wing arms. The length of each deck substantially conforms to the length of the wing arm and the width of each deck is such that the deck can be mounted at it edges onto the top of wing arm. Each of the canopy decks in the assembly is composed of a corrugated structural sheet or its equivalent demountably coupled or affixed to the top of the wing arms, a substrate layer superposed and mounted on the corrugated structural sheet and a means to collect solar radiation superposed on the substrate layer. The substrate layer is composed of a waterproof, rigid material that is thin in cross-section, for example, marine plywood, Nyloboard™ (Nyloboard LLC, Covington, Ga.), or an equivalent water-resistant material of adequate structural capacity. Any type of solar collection means may be employed, but preferred are photovoltaic laminates. One such laminate is manufactured and sold by Uni-Solar, United Solar Ovonic LLC (Rochester Hills, Mich.). The photovoltaic film laminate material is adhered to the top of the substrate layer by any appropriate means. Exemplary are tacks, clips, straps, hold downs, fasteners, and adhesives, with integral adhesives being preferred. When the canopy deck pairs span from one wing to the next, the number of canopy decks required will be one less than the number of wing arms and support columns. In an alternative embodiment, the canopy decks may be twice or thrice as wide, so that additional wings are spanned by each canopy deck.

The fourth major element included in the assembly is a trough, which is formed and positioned centrally extending longitudinally between the proximal edges of the deck canopy that form the structural spine of the assembly. The trough extends lengthwise (longitudinally) from the first pair of wing arms to the terminal pair of wing arms.

Additional elements that can compose the assembly include water storage means positioned either above or below ground level, but in either location below the level of the wing members, and means to transport water from the overhead trough into the water storage means. When the support columns are hollow, the support columns can comprise the water transport means In such case a hole in the trough concentrically located over the open top end of the support column will allow the water to drain from the trough into the support column and a hole in the top of the water storage means will allow the water to drain from the support column into the water storage means by way of a coupling pipe. An optional rain leader tube may be positioned inside the top of the support column to better direct the flow of water down the column. The rain leader tube may be a separate piece or it may be integral with the trough and have a diameter smaller than the diameter of the support column. In the latter case, the rain leader tube will have a diameter identical to the diameter of the hole in the trough. As a separate piece the rain leader tube may be slightly larger in diameter than the diameter of the hole in the trough and smaller than the diameter of the support column. In either case, the rain leader tube projects into the top of the hollow support column.

When the support columns are solid, a separate water conductor mounted adjacent to the support column can be employed. The separate water conductor may be in the form of a tube, however, the shape is unimportant as long as the conductor has the ability to transfer the water from the overhead trough into the water storage means. In such case a hole in the trough, optionally with an integral rain leader, is positioned to project into and drain water directly into the separate water conductor. The water exits the conductor via a coupling pipe and passes through a hole in or near the top of storage means. When the water storage means is positioned below ground level, it and the support columns (and vertically disposed hollow tubes if present) are mounted on an underground footing formed and positioned to support their weight and resist all superimposed structural loads. When the water storage means is positioned above ground, the support columns may be directly mounted onto the ground surface, for example the paving or a pier. In an alternate embodiment, the water storage means may be hung from the wing arms at an appropriate height. In this embodiment, water collected in the water storage means can be used with the need for a separate pump. This would be of particular advantage is the assembly is employed in its marine application.

The dual-inclined, arcuate wing members and the support columns may be composed of high strength-to-weight ratio material. Exemplary materials that may be employed are plastic, fiberglass, aluminum, aluminum alloy, fiber reinforced plastic, composites, composite wood and carbon fiber. Fiber reinforced plastic is preferred. Likewise, the support columns may be composed of the same or a different high strength to weight ratio material. If the support columns are hollow and used for water transport, the columns should be composed of a material that will not decay in the presence of water, for example, plastic, fiberglass, fiber reinforced plastic or carbon fiber.

In another embodiment of the design, the plurality of spaced-apart, wing structural arms may be replaced with a single pair of continuous wings that extend along the length of the entire canopy structure. In this embodiment, the corrugated structural sheet, substrate, and photovoltaic laminate (i.e., the canopy deck) are superposed atop the continuous wings (in that order). Because in this case it is necessary to substantially minimize the weight of the wings, an extremely light-weight material must be employed, for example Nomex® honeycomb panels (DuPont, Wilmington, Del.). The continuous, arcuate wings of this embodiment have an upper portion and a lower portion and are hollow except for one or more fixed braces, or spars, extending between the upper portion of the wings and the lower portion of the wings. Like the first embodiment, the arcuate wings have proximal ends and distal ends and the proximal ends are arranged to be in opposed relation to each other forming a structural spine in the assembly. The curvature in the downwardly-sloping, arcuate, continuous wing arms begins at the distal ends of the wing arms and increases in steepness as one nears the proximal ends and structural spine. The upper and lower portions meet distally in a distal terminus, as is the case in the first described embodiment.

The water storage means should be composed of concrete, fiberglass, metal or other suitable waterproof composite material. Preferably the water storage means comprises a substantially horizontally disposed, rigid, tubular container similar to a water drain pipe of the sort used for water run-off. The container is capped or sealed at each end and extends the length of assembly in substantially the same plane as the structural spine. Such containers are known in the art. See for example, U.S. Patent Publication 2009/0230142 and U.S. Pat. Nos. 4,190,187; 5,954,224; 5,979,748 and 6,852,267.

To enable use of the solar power collected by the canopies, the invention includes at least one inverter to convert direct current from the solar collection means to alternating current for storage and/or distribution. In addition, to maximize its functionality, the system can include at least one vehicle charging outlet, the outlet being able to draw electric power from the inverter, or grid, to charge electric vehicles or other equipment.

In another aspect, the invention is a kit for constructing an arcuate winged solar canopy comprising least two pairs of dual-inclined wing structural arms. The arms are composed of a first pair of low-incidence, downwardly-curved or arcuate wing arms and a second pair of low-incidence, downwardly curved or arcuate wing arms. Each of the first and second pairs of downwardly-curved arcuate wing arms have proximal ends and distal ends. The proximal ends in each pair are arranged to be in opposed relation to each other forming a structural spine in the assembly. The curvature in the downwardly-sloping, arcuate, wing arms begins at the distal ends of the wing arms and increases in steepness as one nears the proximal ends and structural spine. For stability the wing arms increase in thickness from their distal ends, which are relatively thin to their proximal ends, which are relatively thick. In other words, beginning from the proximal end the wings arms taper in thickness approaching the distal end, and terminate in a taper end. These dual-inclined wing members are arranged in spaced apart relation to each other for reasons discussed below.

The kit of the invention also includes at least two support columns for supporting the wing arms. A first support column is end-mounted on a ground surface (or underground as describe above) at its lower end and extends vertically along a substantially longitudinal axis to support at its other end the weight of the first pair of dual-inclined wing structural arms. A second support column is likewise end-mounted on a ground surface and extends vertically along a substantially longitudinal axis to support at its other end the weight of the second pair of dual-inclined wing members. The support columns have a height sufficient to enable vehicles to traverse or park underneath the canopy assembly. The first and second support columns and wing members are in spaced-apart relation to each other. The distance between the support columns and their corresponding structural arms is variable and choosing an appropriate distance is well within the skill in the art, a typical distance being between about 9 ft to about 15 ft. Additional support columns and wing structural arms may be included in the kit and arranged in the same fashion.

The third major element included in the kit is at least one pair of rigid canopy decks. The canopy decks are formed and positioned to span from one wing member pair to another wing member pair and are mounted on the top surface of each wing member at the deck edges. The decks are further formed and positioned to follow the curvature of the pairs of low-incidence, arcuate wing arms. The length of each deck substantially conforms to the length of the wing arm and the width of each deck is such that the deck can be mounted at it edges onto the top of wing arm. Each of the canopy decks in the assembly is composed of a corrugated structural sheet or its equivalent, a substrate layer superposed on the corrugated sheet and a means to collect solar radiation superposed on the substrate layer. Any type of solar collection means may be employed, but preferred are photovoltaic laminates. One such laminate is manufactured and sold by Uni-Solar, United Solar Ovonic LLC (Rochester Hills, Mich.). The photovoltaic film laminate material is adhered to the top of said substrate layer by any appropriate means. Exemplary are tacks, clips, straps, and adhesives, with integral adhesives being preferred. The number of canopy decks included in the kit will be one less than the number of support columns and wing arms provided in the kit.

The fourth major element included in the kit is a trough, which is formed and positioned between the proximal edges that form the structural spine of the assembly. The trough is formed to extend longitudinally from the first pair of wing arms to the second pair of wing arms, or the last pair of wing arms if more than two are provided in the kit, as already described.

Additional elements that may be included the kit include water storage means as described above positioned either above or below ground level, but in either location below the level of the wing members, and means to transport water from the overhead troughs into the water storage means, also as described above. When the support columns are hollow, the support columns can comprise the water transport means. In such case a hole in the trough directly above the open top end of the support column will allow the water to drain from the trough into the support column and a hole in the top of the water storage means will allow the water to drain from the support column into the water storage means. When the support columns are solid, a separate water conductor mounted adjacent to the support column can be employed. The separate water conductor may be in the form of a tube, however, the shape is unimportant as long as the conductor has the ability to transfer the water from the overhead trough into the water storage means. In such case a hole in the trough is positioned to drain water directly into the separate water conductor, and the water exits the conductor via a hole in the storage means. When the water storage means is positioned below ground level, it and the support columns (and vertically disposed hollow tubes if present) are mounted on an underground footing formed and positioned to support their weight and resist all superimposed structural loads.

In another embodiment of the design, the wing structural arms included in the kit may be replaced with a pair of continuous wings that extend along the length of the entire canopy structure, as opposed to a plurality of pairs of wings that are in spaced apart relation to each other extending along the length of the entire canopy structure. The continuous arcuate wings of this embodiment have an upper panel and a lower panel and are hollow except for one or more fixed braces extending between the upper panel of the wings and the lower panel of the wings. Like the first embodiment, the arcuate wings have proximal ends and distal ends and the proximal ends are arranged to be in opposed relation to each other forming a structural spine in the assembly. The curvature in the downwardly-sloping, arcuate, continuous wing arms begins at the distal ends of the wing arms and increases in steepness as one nears the proximal ends and structural spine.

In yet another aspect the invention comprises a method for providing a solar canopy assembly of the invention. The method includes erecting the support columns included in the kit in a space-apart manner such that they extend substantially vertically along their longitudinal axes and are far enough apart so that a vehicle is able to traverse between them. Each pair of dual-inclined wing members included in the kit are mounted at their proximal ends on or near the top of each support column such that the proximal ends in each pair are in opposed relation to each other and form a structural spine in the assembly. The pairs of canopy decks, which are formed and positioned to follow the curvature of the pairs of low-incidence, downwardly curved wing arms, are mounted on the wing members at their edges so that they span from wing arm to wing arm. A water trough is next disposed between the proximal edges of the wing members forming the structural spine and extending lengthwise from wing arm to wing arm. The additional elements included in the kit as described above may then be positioned.

DETAILED DESCRIPTION

Figure 1:
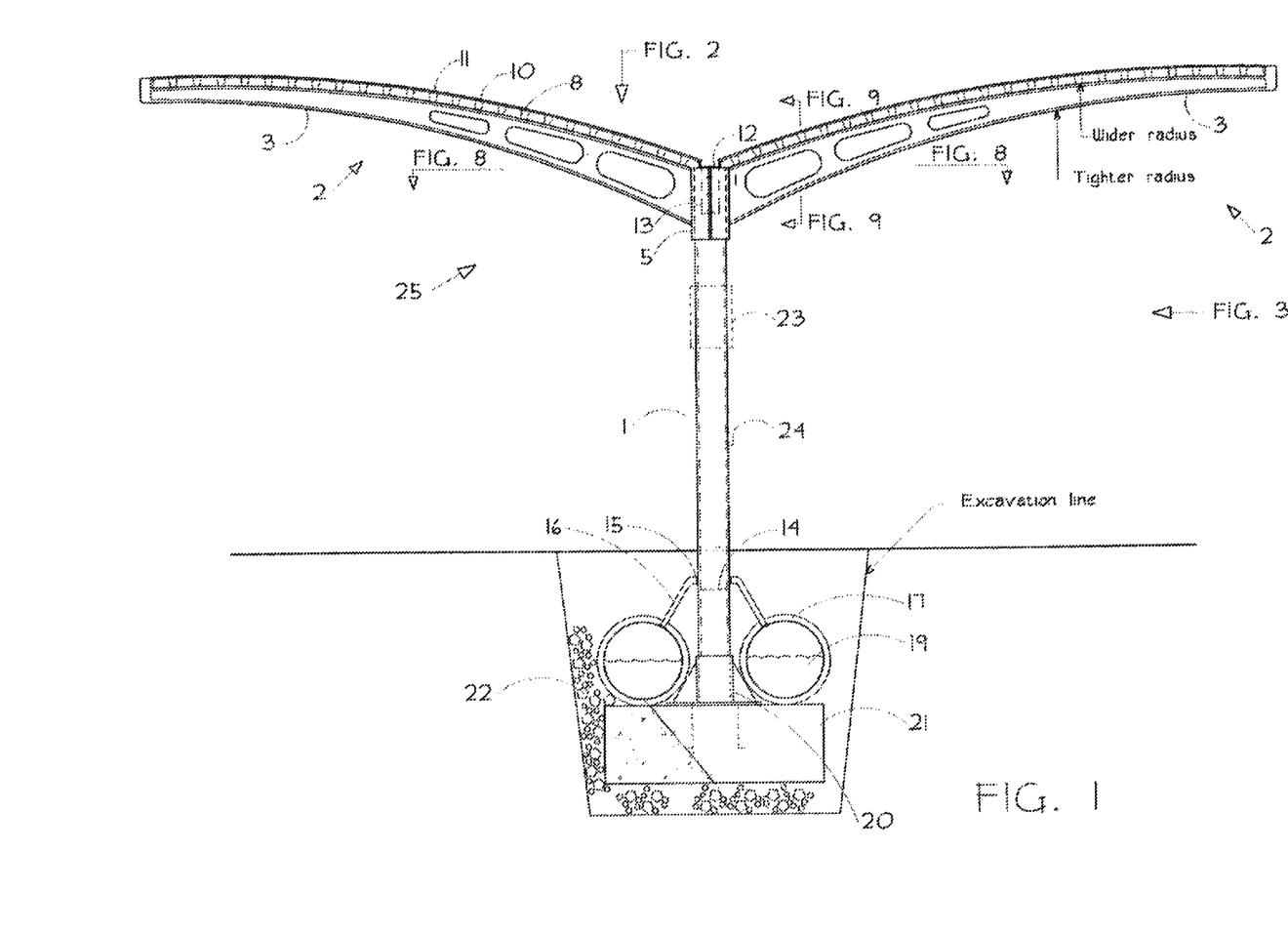
FIG. 1 is a side elevation view of a cross section of the assembly of the invention taken along the line 1-1 in FIG. 2.

FIG. 1 shows a preferred embodiment of the invention. In FIG. 1, canopy assembly 25 is composed of support column 1 which extends substantially vertically from below ground level to a height sufficient to permit the parking of vehicles or storage of equipment under attached wing member 2. Support columns 1 may have a cylindrical shape, although other various shapes may be employed, for example open box, octogonal, hexagon and the like. Wing member 2 is composed of two, arcuate, structural arms 3 attached to support column 1 at one end by means of wing connection flange 5. Mounted on wing structural arms 3 are structural canopy decks (unnumbered) composed of three elements 8, 10 and 11. The structural canopy decks are composed of corrugated structural sheet 8 made of fiberglass, aluminum or fiber reinforced plastic for example. The decks are positioned on structural arm 3 such that the deck's parallel ridges and furrows run parallel to the support columns as can best be seen in FIGS. 1 and 3. The structural canopy decks and structural sheet 8 substantially conform in length to the length of the wing arms and are wide enough to span from one wing arm pair to another wing arm pair. Superposed on and mounted on, and attached to the ridges of, structural deck 8 is substrate 10. Substrate 10 provides a thin, flat surface onto which the means for collecting solar radiation are positioned. Substrate 10 may be composed of any type of waterproof or water resistant planar material that can conform to the arcuate shape of wing member 2. Superposed on and attached to the upper surface of substrate 10 is solar radiation collection means 11. Solar radiation means 11 may comprise a photovoltaic film laminate, a preferred means for the collection of the solar radiation. Such flexible photovoltaic panels or films that can be mounted on curved structures are known in the art. One such film laminate is available through Uni-Solar, United Solar Ovonic LLC (Rochester Hills, Mich. 48309).

Duel-inclined, wing structural arms 3 are formed with a low-incident, arcuate, downwardly-sloping curve and are positioned with one end proximal to the support column and the other end distal to the support column. The curvature in the structural arms begins at the distal end and increases in steepness near the proximal ends, and the height dimension of the structural arms also increases from distal to proximal ends as can best be seen in FIG. 1. The actual height (from arm bottom to arm top) and length (from distal end to proximal end) of the wing arms throughout their span is dependent on the length of the span, the weight of the structural deck, substrate, and solar collection means, and the environment in which the assembly will be used. Preferably, the top and bottom of the structural arms taper or decrease in height as they approach the distal end and they meet and form a taper terminus at the distal end. The determination of an appropriate height and length is within the level of skill in the art.

Structural arms 3 are constructed with a plurality of optional cut-outs, or ovoid holes in order to help minimize its weight. As also shown in FIG. 1, the proximal ends of the arms are in opposed relation to each other, thereby forming a structural spine in the assembly running from support column to support column. Water trough 12 is formed and positioned atop the structural spine with the bottom of the trough positioned directly on the spine, and the sides of the trough adjacent to and meeting the proximal ends of the wing arms such that the trough is able to collect water (or snow). Preferably, the trough is formed with least one hole (not numbered) positioned concentrically over support column 1. Mounted inside support column 1 is cylindrical rain leader 13 extending from trough 12 into support column 1. Rain leader 13 is formed and positioned to direct the water collected in the trough into support columns 1. It's diameter is the same or greater than the diameter of the hole in the trough (See FIG. 2). Also mounted within support columns 1 are column closure discs 14 disposed near the bottom of the support column. The discs are positioned within the columns with the disc edges abutting the interior surfaces of the columns and having their planer surfaces substantially perpendicular to the longitudinal axis of the column, thereby creating a false bottom in the column.

Figures 4, 5, 6, 7, 8, 9, 10:
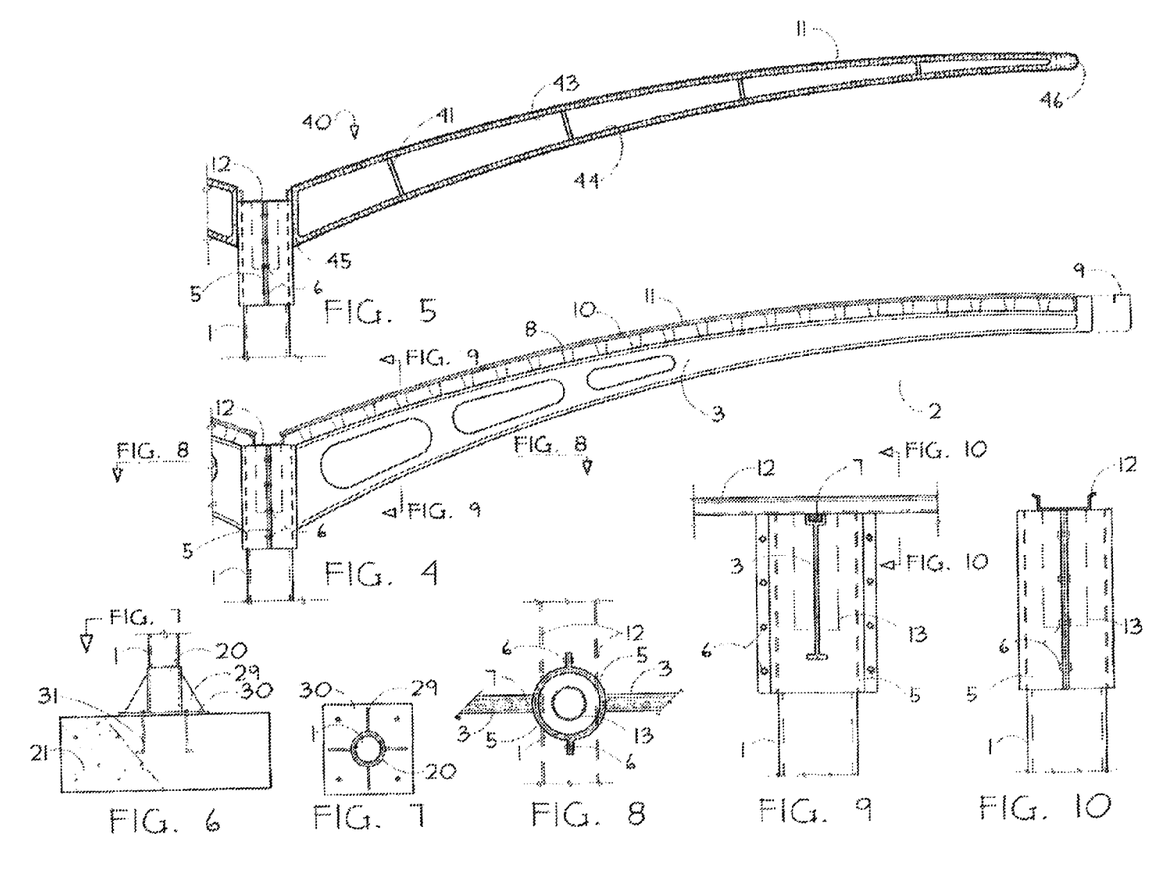
FIG. 4 is a detailed side elevation view of one half of the wing structure of the invention.
FIG. 5 is a detailed side elevation view identical to FIG. 4 but illustrating another embodiment of the wing structure of the invention.
FIG. 6 is a side elevation view of the bottom of the support column element of the assembly.
FIG. 7 is a plan view of FIG. 6.
FIG. 8 is a cross section plan view of the top of the support column taken along the lines 8-8 in FIG. 4.
FIG. 9 is front elevation view of the top of the support column taken along the line 9-9 in FIG. 4.
FIG. 10 is a cross section view of the top of the support column taken along the line 10-10 in FIG. 9.

The two wing arms, 3, can be mounted on support column 1 by a separate mounting member, or the arms may be composed with an integral, flanged, mounting cylinder. That latter embodiment is shown in the figures and best seen in FIGS. 8-10. Referring now to FIG. 8, there is shown in cross sectional plan view wing arms 3, each of which terminates in integral half-cylinder wing connection flange 5. Each flange, 5, is formed in mating half-cylinders which enclose support column 1 and are formed with integral longitudinally-flanged edges. The flanged edges have a series of holes arranged longitudinally from top to bottom (shown in FIG. 9). The mating half-cylinders are positioned such that their flanged edges mate and wing flange connection bolts 6 extend through the series of holes to secure the pairs of wing arms together tightly surrounding the top of support column 1. Also shown is centrally disposed rain leader 13 and water trough 12. In FIGS. 9 and 10 there is shown the relevant portion of wing arms 3 as secured to support column 1 in side elevation views. A series of wing connection bolts extend through holes disposed in the mating flanged portions of the wing connection flanges. Water trough 12 is positioned above and rests on the top end of support column 1 and the mating flanged portions of the integral wing connection flanges of wing structural arms 3. Trough 12 is formed with a flat bottom, and opposed, upwardly extending, parallel sides which bend outwardly at the uppermost portion forming dog legs 23 so as to fit under the proximal edges of corrugated structural sheet 8 (best seen in FIG. 4). Optionally, trough 12 may be formed with integral centrally mounted splashguard 26 to assist in maximizing the amount of rainwater caught by trough 12. Cylindrical rain leader 13, open on both ends, has a diameter the same or slightly greater than the diameter of the hole in trough 12 for the purpose of leading the water into support column 1. Deck attachment block 7 provides additional stability to the structural arms at their mounting point on support column 1.

Figure 2:
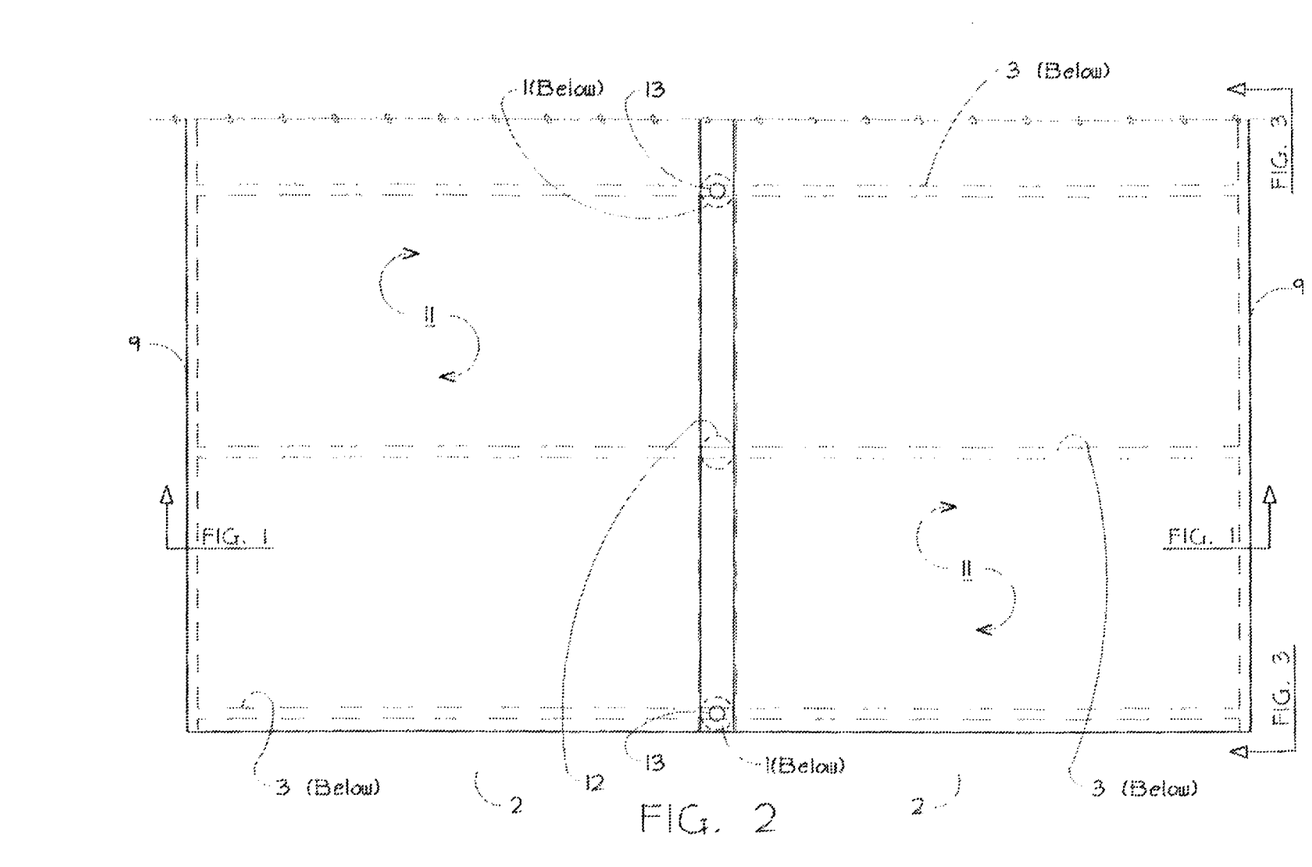
FIG. 2 is a plan view of the assembly of the invention.

FIG. 2 is a plan view of the assembly of the invention illustrating the general position of structural arms beneath and supporting structural sheet 8, substrate 10 and solar radiation collection means, 11. Three structural arms, 3, are illustrated in this figure only two of which have rain leaders for water collection. The maximum number of rain leaders employed is limited by the number of support columns; any number equal to or less than the number of support columns will work, although many less may be necessary to allow the flow of water into the support columns in the given environment in which the canopy is used. As can be seen, structural arms 3 are in regular spaced-apart relation to each other to permit parking and transverse of vehicles under the canopy assembly.

Figure 3:
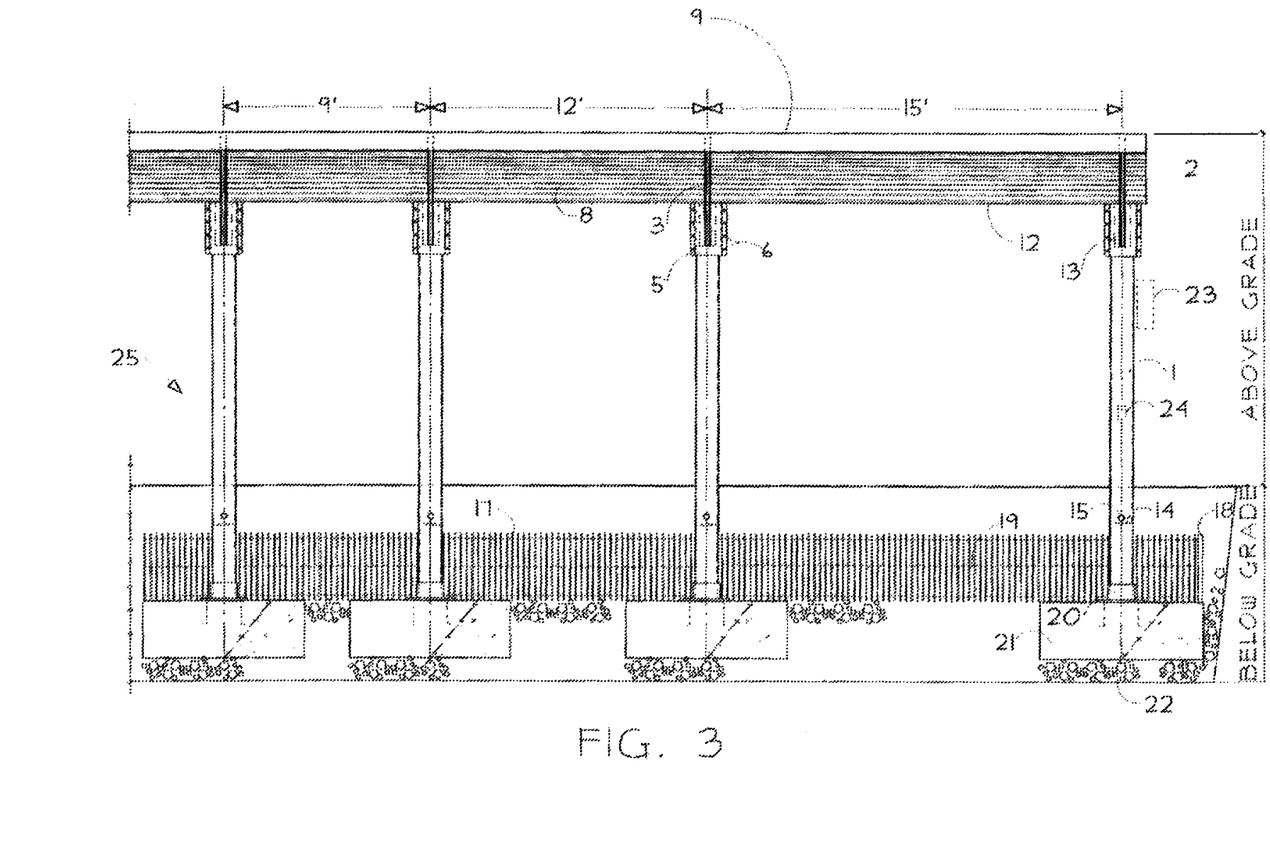
FIG. 3 is a front elevation view of the assembly of the invention.

FIG. 3 is a front elevation view of the canopy assembly 25 of the invention. In FIG. 3 there is illustrated a plurality of spaced-apart support columns 1 having a plurality of spaced-apart structural arms 3 supported thereby and mounted thereon by means of connection flange 5 and connection bolts 6. The columns and structural arms may be spaced any distance apart, although three different distances of 9, 12 and 15 feet are shown. Mounted on structural arms 3 is the canopy deck. At the distal edge of the deck there is formed and arranged deck closure bracket 9 extending longitudinally along the distal end of the deck so as to enclose the distal edge of the deck. Deck closure bracket may be fastened to the deck by appropriate fastening means or it may be formed to be demountably coupled to the distal edge and clipped into place without fasteners. Water collection means 17, sealed by water caps 18 at both ends, is shown extending longitudinally beneath the ground surface the entire length of canopy assembly 25. Collection means 17 is connected to water trough 12 by means of structural arm 3 as discussed in general terms previously. Structural arm 3 is formed having one or more bore(s), 15, through its side and positioned slightly above (higher than, in the vertical direction) the top of water collection means 17. A coupling pipe, 16, (not shown in FIG. 3; see FIG. 1) extends between bore 15 and collection means 17 to enable water to flow from the column into the collection means. As illustrated in FIG. 3, bore 15 is positioned high enough on structural arm 3 so that gravity flow is used to move the water from the water trough into the water collection means but bore 15 is not positioned so high that coupling pipe 16 is very long in order to minimize the chance of pipe breakage. Below bore 15 and mounted within wing structural arm 3 is column closure plate 14, which provides a bottom to prevent water leakage from reaching and damaging the bottom of the structural arm at its mounting end. Collection means 17 is, in its preferred embodiment, made of tubular HDPE pipe; however, other water-tight containers are well known in the art and may be used for this purpose. In operation, rain or snow hits the canopy deck and is shunted into water trough 12 by means of the arcuate sloping of the deck. From the trough, the rain or snow enters the support columns by means of the hole(s) in the columns and the optional rain leader(s) 13. Gravity then carries the water or snow, 19, into water storage means 17. Support columns 1 are mounted on underground footings 21, which are surrounded by structural fill 22. Alternatively, the support columns may be mounted above-ground. The mounting means is discussed in detail below in reference to FIGS. 6-7.

Also shown in FIG. 3 are optional elements inverter 23 and vehicle charging outlet 24. Inverter 23 converts direct current from the solar radiation collection means to alternating current for storage and/or distribution. Vehicle charging outlet 24 is coupled to and able to draw electric power from the inverter to charge electric vehicles or other electric equipment. How these elements are positioned in the canopy assembly is not critical, so long as they can be accessed and made use of by vehicles and the like. This is within the level of skill in the art.

FIGS. 4-5 illustrate different embodiments of the wing structural arms of the assembly. In FIG. 4 the arm is shown with integral wing connection flange 5 as discussed previously. Bracket shaped deck closure plate 9 covers the distal end of the arm for cosmetic purposes as briefly discussed above. The edges of the canopy deck are affixed to the top of wing structural arm 3 by means of a mounting in or on the furrows of corrugated sheet 8. This mounting may a permanent mounting or, preferably, the deck may be removably affixed, for example by a plurality of bolts extending through mating holes in the furrowed portion of the deck and in the arm, or by a plurality of screws. Methods of either permanent or removable affixation are known in the art and may be employed for this purposed. Resting and superposed on the ridges of corrugated sheet 8 is substantially planer, flexible substrate 10, the side edges of which are affixed to the ridge portions of deck 8. Superposed on the top surface of substrate 10 and extending on all sides to the edges of the substrate is flexible photovoltaic laminate 11 and water trough 12 is shown centrally disposed, with its dog leg upper portion 27 contiguous with the underside of the deck ridge.

FIG. 5 illustrates a second embodiment of the wing structural arm of the assembly in which the plurality of paired, space-apart wing structural arms are eliminated and replaced by a pair of continuous wings that extend longitudinally along the entire canopy structure. The continuous arcuate wings, 40, of this embodiment have an upper panel 43 and a lower panel 44 and are hollow except for one or more fixed braces or spars, 41, extending between the upper panel of the wings and the lower panel of the wings. Like the first embodiment, hollow continuous wings 40 are formed with a low-incident, arcuate, downwardly-sloping curve and are positioned with one end proximal to support column 1 and the other end distal to the support column. Also like the first embodiment, the continuous arcuate wings have proximal ends 45 and distal ends 46 and the proximal ends and are arranged to be in opposed relation to each other forming a structural spine in the assembly. The arcuate curvature in the continuous hollow wings begins at the distal end and increases in steepness near the proximal ends, and the height dimension of the hollow wings also increases from distal to proximal ends. In other words, the upper and lower panels 43 and 44 taper or decrease in height as they approach the distal end of the wings and form a taper terminus at distal end 46. The actual height and length (from distal end to proximal end) of the hollow wings throughout their span is dependent on the length of the span, the weight of the structural sheet, substrate, and solar collection means, and the environment in which the assembly will be used. The same mounting means may be employed to attach hollow wings 40 to support columns 1 as in the first embodiment. The upper panel 43 of the continuous wings forms a structural deck upon which the solar radiation collection means 11 is removably affixed on the top surface. The solar collection means is preferably a flexible photovoltaic laminate that can be rolled into position on the top surface of the continuous wings and fixed thereto by any appropriate means, for example clamps, clips, pins, screws, bolts and other hold downs and fasteners that can be removed to simplify replacement of the laminate.

FIGS. 6-7 illustrate the manner in which support columns 1 can be mounted to either pavement or to underground footing 21 as illustrated in FIG. 1. In either case, the bottom end of the support column is secured in a substantially vertical manner by means of annular restraint collar 20, which is bolted in place on the pavement or to the top of underground footing 21 by means of bolts 31. Collar 20 has a flat bottom plate 30 a centrally disposed upwardly extending annular collar and a plurality of angled, stabilizing flanges 29, which assist in maintaining support column 1 in a substantially vertical manner. Collar 20 may be formed from any type of heavyweight, rigid material, for example, steel or other metal alloy.

The invention is not limited to the embodiments explained above. It will be understood that many additional changes in the details, materials, steps and arrangement of parts that have been herein described and illustrated to explain the nature of the invention may be made by those skilled in the art within the principle and scope of the invention as expressed in the appended claims.

I claim:

1. A solar canopy assembly comprising:
   (a) at least a pair of dual-inclined wing members disposed in opposition, each wing member comprising a low-incidence, downwardly-curved, arcuate, wing member with a proximal end, a distal end, and a curvature spanning from the proximal end to the distal end, wherein the proximal ends of the wing members are disposed in opposed relation to each other forming a structural spine, said curvature in said downwardly-curved wing members beginning at said distal ends and increasing in steepness near said proximal ends;
   (b) at least one support column for supporting said wing members, wherein the support column is end-mounted on a ground surface at a lower end of the support column and extending substantially vertically along a longitudinal axis of the support column to support at an upper end of the support column the weight of the dual-inclined wing members;
   (c) wherein each wing member has at least one canopy deck, wherein each canopy deck is formed and positioned with a proximal edge adjacent to the proximal end of the wing member, a distal edge adjacent to the distal end of the wing member, and a curvature from the proximal edge to the distal edge in conformity with the curvature of the low-incidence, downwardly curved wing member;
   (d) at least one trough formed to collect water and disposed between said proximal ends forming said structural spine and extending lengthwise from said first pair of wing arms to said second pair of wing arms;
   (e) photovoltaic material superposed on the canopy decks from adjacent to the proximal edge of each canopy deck to adjacent to the distal edge of each canopy deck in conformity with the curvature of each canopy deck whereby the photovoltaic material superposed on each canopy deck has a curvature corresponding to the curvatures of the canopy deck and the wing arms; and
   (f) wherein each wing member further comprises a pair of low-incidence, downwardly-curved, arcuate, wing arms, each wing arm with a proximal end, a distal end, and a curvature spanning from the proximal end to the distal end and further comprising a second support column end-mounted on a ground surface at a lower end of the second support column and extending substantially vertically along a longitudinal axis of the second support column to support at an upper end of the second support column the weight of the dual-inclined wing members wherein the proximal ends of the wing arms are formed as mating, flanged, half-cylinders, and wherein the wing arms have concave surfaces positioned around said upper end of said support columns.

2. The solar canopy assembly according to claim 1 wherein each of said canopy decks are composed of a corrugated structural sheet, a substrate layer superposed on said corrugated structural sheet and wherein the photovoltaic material is superposed on said substrate layer.

3. The solar canopy assembly according to claim 2 wherein the photovoltaic material comprises a photovoltaic film laminate superposed on and adhered to the top of said substrate layer.

4. The solar canopy assembly according to claim 2 wherein said dual-inclined wing members and said support columns are composed of high strength to weight ratio material.

5. The solar canopy assembly according to claim 4 wherein said high strength to weight material is selected from the group consisting of plastic, fiberglass, aluminum, aluminum alloy, fiber reinforced plastic, composite wood and carbon fiber.

6. The solar canopy assembly according to claim 4 wherein said support columns are composed of plastic, fiberglass, fiber reinforced plastic or carbon fiber.

7. The solar canopy assembly according to claim 2 wherein said support columns are hollow and said at least one trough has at least one hole disposed over at least one of the support columns to accept water flow into said support column.

8. The solar canopy assembly according to claim 2 wherein each support column is solid and said canopy assembly further includes a plurality of hollow tubes adjacent and attached to said support columns to accept water flow from said at least one trough, said at least one trough with a plurality of holes disposed over said hollow tubes.

9. The solar canopy assembly according to claim 7 further including water storage means disposed below ground level and connected to said lower end of said support column to receive water from the support column.

10. The solar canopy assembly according to claim 8 further including water storage means disposed below ground level and connected to said lower end of said hollow tubes to receive water from the hollow tubes.

11. The solar canopy assembly according to claim 9 wherein said water storage means and said support columns are mounted on an underground footing.

12. The solar canopy assembly according to claim 10 wherein said water storage means, said support columns and said hollow tubes are mounted on an underground footing.

13. The solar canopy assembly according to claim 11 wherein said water storage means is composed of concrete, fiberglass, or metal.

14. The solar canopy assembly according to claim 12 wherein said water storage means is composed of concrete, fiberglass, or metal.

15. The solar canopy assembly according to claim 3 further including an inverter to converts direct current from the photovoltaic material to alternating current for storage and/or distribution.

16. The solar canopy assembly according to claim 15 further including a vehicle charging outlet, said outlet being able to draw electric power from said inverter to charge electric vehicles or electric equipment.

17. A solar canopy assembly comprising:
(a) at least two pairs of dual-inclined wing members comprising a first pair of low-incidence, downwardly curved, wing arms and a second pair of low-incidence, downwardly curved, wing arms, each of said first and second pairs of downwardly curved, wing arms having proximal ends, distal ends, and a curvature spanning from the proximal ends to the distal ends, said proximal ends in each pair being in opposed relation to each other, said curvature in said downwardly-curved wing arms beginning at said distal ends and increasing in steepness near said proximal ends, said wing arms increasing in thickness from the distal ends to the proximal ends of the wing arms, said dual-inclined wing members being arranged in spaced apart relation to each other the solar canopy assembly further comprising a first support column and a second support column, the second support column end-mounted on a ground surface at a lower end of the second support column and extending substantially vertically along a longitudinal axis of the second support column to support at an upper end of the second support column the weight of the dual inclined wing members, wherein said proximal ends of each of said first and second pairs of wing arms are formed as mating, flanged, half-cylinders, and wherein the first pair of wing arms have concave surfaces positioned around said upper end of said first support column and wherein the second pair of wing arms have concave surfaces positioned around said upper end of said second support column;
(b) at least two hollow support columns for supporting said wing members, a first support column end-mounted on a ground surface at a lower end of the first support column and extending vertically along a substantially longitudinal axis to support at an upper end of the first support column the weight of said first pair of dual-inclined wing members and a second support column end-mounted on a ground surface and extending vertically along a substantially longitudinal axis to support at an upper end of the second column the weight of said second pair of dual-inclined wing members, said wing members being mounted on said columns at said upper ends;
(c) at least one pair of canopy decks, said canopy decks being mounted to said pairs of dual-inclined wing members to span from one pair of wing members to another pair of wing members, and being formed and positioned with proximal edges adjacent to the proximal ends of the wing arms, distal edges adjacent to the distal ends of the wing arms, and with a curvature from the proximal edges to the distal edges in conformity with the curvature of said pairs of low-incidence, downwardly curved wing arms; wherein said at least one pair of canopy decks is composed of a corrugated structural sheet, a substrate layer superposed on said structural sheet; and
(d) at least one trough formed to collect water and disposed between proximal edges of said canopy decks and extending lengthwise from said first pair of wing arms to said second pair of wing arms, said trough with at least one hole disposed over each support column to permit water flow into said support columns;
(e) water storage means disposed below ground level and connected to said lower end of said support columns to receive water from the support columns;
(f) photovoltaic material superposed on the canopy decks from adjacent to the proximal edge of each canopy deck to adjacent to the distal edge of each canopy deck in conformity with the curvature of each canopy deck whereby the photovoltaic material superposed on each canopy deck has a curvature corresponding to the curvatures of the canopy deck and the wing arms;
(g) at least one inverter to convert direct current from said photovoltaic material to alternating current for storage and/or distribution; and
(h) at least one vehicle charging outlet, said outlet being able to draw electric power from said inverter to charge electric vehicles or electric equipment.

18. A kit for constructing a solar canopy assembly comprising:
(a) at least two pairs of dual-inclined wing members comprising a first pair of low-incidence, downwardly-curved, arcuate, wing arms and a second pair of low-incidence, downwardly-curved, arcuate, wing arms, each of said first and second pairs of downwardly curved, wing arms having proximal ends, distal ends, and a curvature spanning from the proximal ends to the distal ends, said proximal ends in each pair being in opposed relation to each other forming a structural spine, said curvature in said downwardly-curved wing arms beginning at said distal ends and increasing in steepness near said proximal ends, said wing arms increasing in thickness from the distal ends to the proximal ends of the wing arms, and said at least two pairs of dual-inclined wing members being arranged in spaced apart relation to each other;
(b) at least two support columns for supporting said wing members, a first support column end-mounted on a ground surface at a lower end of the first support column and extending substantially vertically along a longitudinal axis of the first support column to support at an upper end of the first support column the first pair of dual-inclined wing members and a second support column end-mounted on a ground surface and extending vertically along a substantially longitudinal axis to support at an upper end of the second support column the second pair of dual-inclined wing members, said wing members being mounted on said columns at said upper ends; wherein the proximal ends of the wing arms are formed as mating, flanged, half-cylinders, and wherein the wing arms have concave surfaces positioned around said upper end of said support columns;
(c) at least one pair of canopy decks, said canopy decks with proximal edges and being mounted to said pairs of dual-inclined wing members to span from one pair of wing members to another pair of wing members, and being formed and positioned with proximal edges adjacent to the proximal ends of the wing arms, distal edges adjacent to the distal ends of the wing arms, and with a curvature from the proximal edges to the distal edges in conformity with the curvature of said pairs of low-incidence, downwardly curved wing arms;
(d) at least one trough formed to collect water and disposed between said proximal edges of the canopy decks and extending lengthwise from said first pair of wing arms to said second pair of wing arms; and (e) photovoltaic material superposed on the canopy decks from adjacent to the proximal edge of each canopy deck to adjacent to the distal edge of each canopy deck in conformity with the curvature of each canopy deck whereby the photovoltaic material superposed on each canopy deck has a curvature corresponding to the curvatures of the canopy deck and the wing arms.

* * * * *